United States Patent
Wang

(10) Patent No.: US 8,128,883 B1
(45) Date of Patent: Mar. 6, 2012

(54) THERMOELECTRIC REFORMER UNIT FOR HYDROGEN PRODUCTION

(76) Inventor: Chi S. Wang, Woodridge, IL (US)

( * ) Notice: Subject to any disclaimer, the term of this patent is extended or adjusted under 35 U.S.C. 154(b) by 532 days.

(21) Appl. No.: 12/321,275

(22) Filed: Jan. 20, 2009

(51) Int. Cl.
- B01J 19/08 (2006.01)
- B01J 19/12 (2006.01)
- B01J 8/00 (2006.01)
- B01J 10/00 (2006.01)
- B01J 7/00 (2006.01)

(52) U.S. Cl. ............... 422/186; 422/186.04; 422/186.3; 422/600; 422/625; 48/61

(58) Field of Classification Search .................. None
See application file for complete search history.

(56) References Cited

U.S. PATENT DOCUMENTS

| | | | |
|---|---|---|---|
| 5,602,297 | A | 2/1997 | Wang |
| 5,614,156 | A | 3/1997 | Wang |
| 5,746,985 | A | 5/1998 | Takahashi |
| 5,929,286 | A | 7/1999 | Krumpelt et al. |
| 5,939,025 | A | 8/1999 | Ahmed et al. |
| 6,245,309 | B1 * | 6/2001 | Etievant et al. ............. 423/248 |
| 6,458,478 | B1 | 10/2002 | Wang et al. |
| 6,565,716 | B1 * | 5/2003 | Ruan et al. ................. 204/165 |
| 7,017,594 | B2 * | 3/2006 | Kurunczi ................. 134/22.18 |
| 7,070,634 | B1 | 7/2006 | Wang |
| 7,442,364 | B1 | 10/2008 | Wang |
| 2006/0138957 | A1 * | 6/2006 | Fujioka et al. ............. 313/586 |
| 2008/0138676 | A1 * | 6/2008 | Adams ......................... 429/17 |

OTHER PUBLICATIONS

"Plasma" in The Free Online Encyclopedia, retrieved Jun. 28, 2011.*
Yhi, Stephen Properties of Pure Metals, Properties and Selection: Nonferrous Alloys and Special-Purpose Materials, vol. 2, ASM Handbook, ASM International, 1990, p. 1099-1201.*

* cited by examiner

Primary Examiner — Jill Warden
Assistant Examiner — Charles D Hammond
(74) Attorney, Agent, or Firm — Philip H. Kier

(57) ABSTRACT

A thermoelectric reformer unit-for dissociating fossil-based hydrocarbons, renewable hydrocarbons or hydrogen-containing inorganic compounds to produce hydrogen in a reactor using thermoelectric technology with thermoelectric materials to achieve very high conversion efficiencies. Thermoelectric reforming occurs in a reactor core containing a number of energy sources. These energy sources generate extremely high temperature heat that reacts with the fuels in its local surrounding areas. Since the heat is locally generated, it will not penetrate far within the reactor core that is surrounded by walls that act as a casing for the reformer. Synthetic gas produced in the reformer can be fed into internal combustion engines certain, types of fuel cells, or other energy conversion equipment without or with only limited levels of purification. Ancillary components are needed to produce high-purity hydrogen fuel for other types of fuel cells.

9 Claims, 6 Drawing Sheets

THERMOELECTRIC REFORMER UNIT FOR HYDROGEN PRODUCTION

BACKGROUND OF THE INVENTION

This invention pertains to the reforming of liquid, gaseous or vaporized hydrocarbons, inorganic compounds, or mixtures thereof, to produce hydrogen for direct use or for use in a fuel cell. More particularly, it pertains to a thermoelectric reformer unit for dissociating fossil-based hydrocarbons (e.g., methane, methanol, ethanol, gasoline, diesel oil, propane), renewable hydrocarbons (e.g., vegetable oils, or biomass oils), or inorganic compounds (e.g., water, ammonia, and hydrogen sulfide) to produce hydrogen in a thermoelectric reactor using thermoelectric technology with thermoelectric materials, including—bimetals to achieve very high conversion efficiencies.

Hydrogen has long been recognized as an ideal fuel for power generation systems with virtually no emissions of air pollutants and greenhouse gases. It can be used in fuel cells or hydrogen-fueled internal combustion engines to power vehicles or to provide electricity and thermal energy (cogeneration) in stationary, distributed energy generation units. Fuel cells are being developed for applications in the transportation sector and the distributed power generation sector because the expected energy security, environmental, and economic benefits are truly significant. Efficient reformer for producing hydrogen for use in fuel cells is an active area of invention. For example, Takahashi in U.S. Pat. No. 5,746,985 and Edlund, et al in U.S. Pat. No. 6,221,117 teach use of a steam reforming reaction, Krumpelts, et al in U.S. Pat. No. 5,929,286, Admed, et al in U.S. Pat. No. 5,939,025 and U.S. Pat. No. 5,942,346 teach the use of partial oxidation processes, Wang in U.S. Pat. Nos. 7,442,364, 7,070,634, 6,458,478, 5,614,156 and 5,602,297 teach the use of thermal plasma reforming processes.

Fuel cells would be commercially viable tomorrow if there were an inexpensive, easier way to produce, transport, and distribute hydrogen. However, without widespread use of fuel cell vehicles, massive investments in a hydrogen-refueling infrastructure, such as hydrogen refueling stations are not likely to occur. Therefore, to facilitate the market acceptance and penetration of fuel cell powered vehicles, implementation of an alternative method of refueling is imperative. This commonly accepted notion is supported by the U.S. Department of Energy in its emphasis on the development of fuel-flexible multi-fueled reformers, especially for use with renewable energy sources such as bio-fuels. The present invention has high conversion efficiencies and low power consumption as a percentage of fuel cell output. Its hydrogen reformer potentially can significantly reduce hydrogen production costs to help make widespread use of fuel cell powered vehicles and stationary installations a reality.

Widespread deployment of fuel-cell-powered power plants in the United States could result in economic benefits resulting from energy saving in the range of billions of US dollars, reliable power supply, and emission reductions. Besides, fuel cell powered vehicles fueled by hydrogen derived from domestically produced alternative fuels such as ethanol, methanol, or natural gas with a reformer would simultaneously reduce the nation petroleum demand. Also, hydrogen has the potential to be a more versatile energy carrier than electricity, yielding tremendous business opportunities. Thermoelectric reformers have other applications than producing hydrogen. They can be used to destroy volatile organic compounds as taught by Wang in U.S. Pat. No. 5,614,156 or to dissociate hydrogen sulfide into hydrogen and sulfur as taught by Wang in U.S. Pat. No. 5,843,395.

SUMMARY OF THE INVENTION

The present invention is a thermoelectric reformer unit for producing hydrogen. The heart of the invention is a thermoelectric reactor, or reformer, that uses thermoelectric technologies and materials to achieve very high conversion efficiencies for hydrogen production. The thermoelectric reformer unit is comprised of the thermoelectric reformer and ancillary components that include components to remove water, convert carbon monoxide to carbon dioxide, separate carbon dioxide from hydrogen, and to separate off-gas from hydrogen rich gas. This thermoelectric reformer unit may be a stand-alone unit or a component of an integrated system for electric power generation such as taught by Wang and Lyons in U.S. Pat. No. 6,458,478. Such an integrated system is sufficiently light-weight that it can be used for on-board vehicle applications, on-site refueling stations, and on-site stationary power generation systems.

The thermoelectric reformer is designed to reform organic and inorganic compounds in a liquid, gaseous or vaporized feed stream. Liquid fuel need not be atomized and vaporized through an injector or atomizer before entering to the reactor. It can be directly used in the reactor core. Thermoelectric (ionization or dissociation) reforming occurs in a reactor core containing a number of energy sources. These energy sources generate extremely high temperature heat within the thermoelectric electrode; the heat being emitted as photons or light that carry electromagnetic waves and reacts with fuels in the waves immediate surrounding area. Since heat is generated locally, it will not penetrate far within the reactor core that is surrounded by several ceramic or stainless steel or metal alloy walls. However, additional insulating zones (not shown) surrounding the outer surface of the reactor casing minimize the loss of energy from the reactor core and from the reactor itself. Thus very high energy conversion efficiency is achieved. High-density fibers that are commercially available, (e.g., ceramic fibers composed of alumina, silica, or mullite) can be used as insulation material at the insulation zones. High temperature in the reactor core is obtained from applying electrical voltage and current through a circuit containing thermoelectric materials or bimetals such as Fe—Si, Si—Ge, Sb—Te, Ge—Pb—Te, Pb—Te, Pb—Se, Pb—Se—Te, $Bi_2Te_3$, and $Sb_2Te_3$.

Due to characteristics of the extremely high thermal conductivity and high electric conductivity of the thermoelectric materials, the heat energy converted from electricity is transmitted as photons, or light, to the surrounding liquid or gaseous fuels. In this way, the fuels are decomposed and dissociated into synthetic gas that typically contains hydrogen, carbon monoxide, carbon dioxide and trace amount of hydrocarbons such as $CH_4$, $C_2H_2$, $C_2H_4$ and $C_2H_6$. Electrical circuits for the energy sources in the reactor core are designed to set up a continuous operation that creates optimal conditions for enhancing reactions rates, and hence a high level of reforming (or conversion) efficiency. An attractive feature of the thermoelectric reformer is that it uses only fuel and electricity. There is no combustion and therefore no air is required. Consequently, dilution effects from nitrogen or from the formation of nitrogen oxides and/or ammonia are absent.

Preliminary reforming tests have been performed using the thermoelectric reformer with one inorganic compound ($H_2O$) and two renewable organic materials (vegetable oil and sugar water) as input. The results are given in Table 1 in terms of the molar fractions of the various reforming products in the syngas leaving reformer.

TABLE 1

Molar Fractions of the Syngas Measured Using
Water, Sugar and Water, and Vegetable Oil, Respectively as Fuel Sources.

| Fuel | Molar Fraction of Constituents of Syngas (%) | | | | | | | |
|---|---|---|---|---|---|---|---|---|
| | Total[1] | $H_2$ | CO | $CO_2$ | $CH_4$ | $C_2H_6$ | $C_2H_4$ | $C_2H_2$ |
| $H_2O$ | 100.06 | 53.4 | 40.4 | 4.37 | 0.94 | 0.62 | 0.15 | 0.18 |
| $H_2O$ | 99.99 | 51.4 | 43.4 | 4.23 | 0.57 | 0.21 | 0.06 | 0.12 |
| Sugar + $H_2O$ | 100 | 57.2 | 35.6 | 7.00 | 0.129 | 0.040 | 0.00 | 0.0415 |
| Sugar + $H_2O$ | 100 | 57.4 | 35.3 | 7.02 | 0.20 | 0.038 | 0.00 | 0.0412 |
| Salad Oil | 100.06 | 54.2 | 9.13 | 1.83 | 6.81 | 4.42 | 23.5 | 0.17 |
| Salad Oil | 100.07 | 50.4 | 8.23 | 23.2 | 3.4 | 4.08 | 10.6 | 0.16 |
| Salad Oil | 100.10 | 42.9 | 14.1 | 3.24 | 7.81 | 14.8 | 16.8 | 0.45 |
| Salad Oil | 100.03 | 65.2 | 8.36 | 0.00 | 6.04 | 7.01 | 0.224 | 13.2 |
| Salad Oil | 100 | 62.1 | 9.40 | 0.00 | 6.81 | 7.97 | 0.254 | 13.7 |
| Salad Oil | 99.8 | 68.5 | 7.90 | 0.00 | 5.87 | 6.39 | 0.208 | 10.9 |
| Salad Oil | 100 | 65.8 | 7.83 | 0.00 | 4.94 | 4.21 | 0.097 | 17.3 |
| Salad Oil | 99.9 | 66.5 | 7.72 | 0.00 | 4.87 | 4.13 | 0.106 | 16.6 |
| Salad Oil | 100 | 53.6 | 17.8 | 0.00 | 7.04 | 12.2 | 0.655 | 8.67 |
| Salad Oil | 100 | 50.9 | 20.9 | 0.00 | 6.33 | 11.0 | 0.642 | 10.3 |

[1]Total = $H_2$ + CO + $CO_2$ + $CH_4$ + $C_2H_6$ + $C_2H_4$ + $C_2H_2$
$H_2$ is hydrogen
CO is carbon monoxide
$CO_2$ is carbon dioxide
$CH_4$ is methane
$C_2H_6$ is ethane
$C_2H_4$ is acetylene
$C_2H_2$ is ethene Table 1 shows the molar fractions of the syngas measured by GC/MS using water, sugar and water, and vegetable oil, respectively as fuel sources. Some results shows different in numbers even using the same fuel source because different grades of thermoelectric electrodes and different operational conditions such as electric currents and voltages were used. The measured conversion efficiencies that can be seen from the column of Total are near 100%. The calculated energy efficiency that is defined as $\eta\eta$=(total heating value of the syngas)/(heating value of the fuel+electric energy) is nearly 100% also.

In the 21$^{st}$ Century, hydrogen is a clean energy alternative. Hydrogen production from hydrogenous materials (such as hydrocarbons and water) using light-carrying heat-propagating electromagnetic waves is the most effective and fastest way of producing hydrogen. Instant reactions translate to fast start and precision control in commercial applications. Therefore, hydrogen-on-demand technology has the potential to become a mainstream energy technology. Most of the expense and challenge of hydrogen storage technology, especially for the energy and transportation sectors, can be eliminated. This means that a small-scale on-site reformer for stationary distributed power or a compact on-board hydrogen-on-demand reactor for fuel cell vehicles can eliminate the significant capital investments in a dedicated hydrogen storage system such as hydrogen storage tank and hydrogen delivery infrastructure such as $H_2$-refueling stations.

A primary object of the instant invention is to directly use both high electrical and thermal conductivities of the thermoelectric materials to transmit the electrical energy into light for hydrogen-rich synthetic gas production Among other objects of this invention are solving hydrogen production and delivery issues, providing competitive-priced and affordable, and make the hydrogen economy feasible to consumers, and make a hydrogen-based economy feasible if not practicable.

BRIEF DESCRIPTION OF THE SEVERAL VIEWS

DETAILED DESCRIPTION OF THE INVENTION

Figure 1:
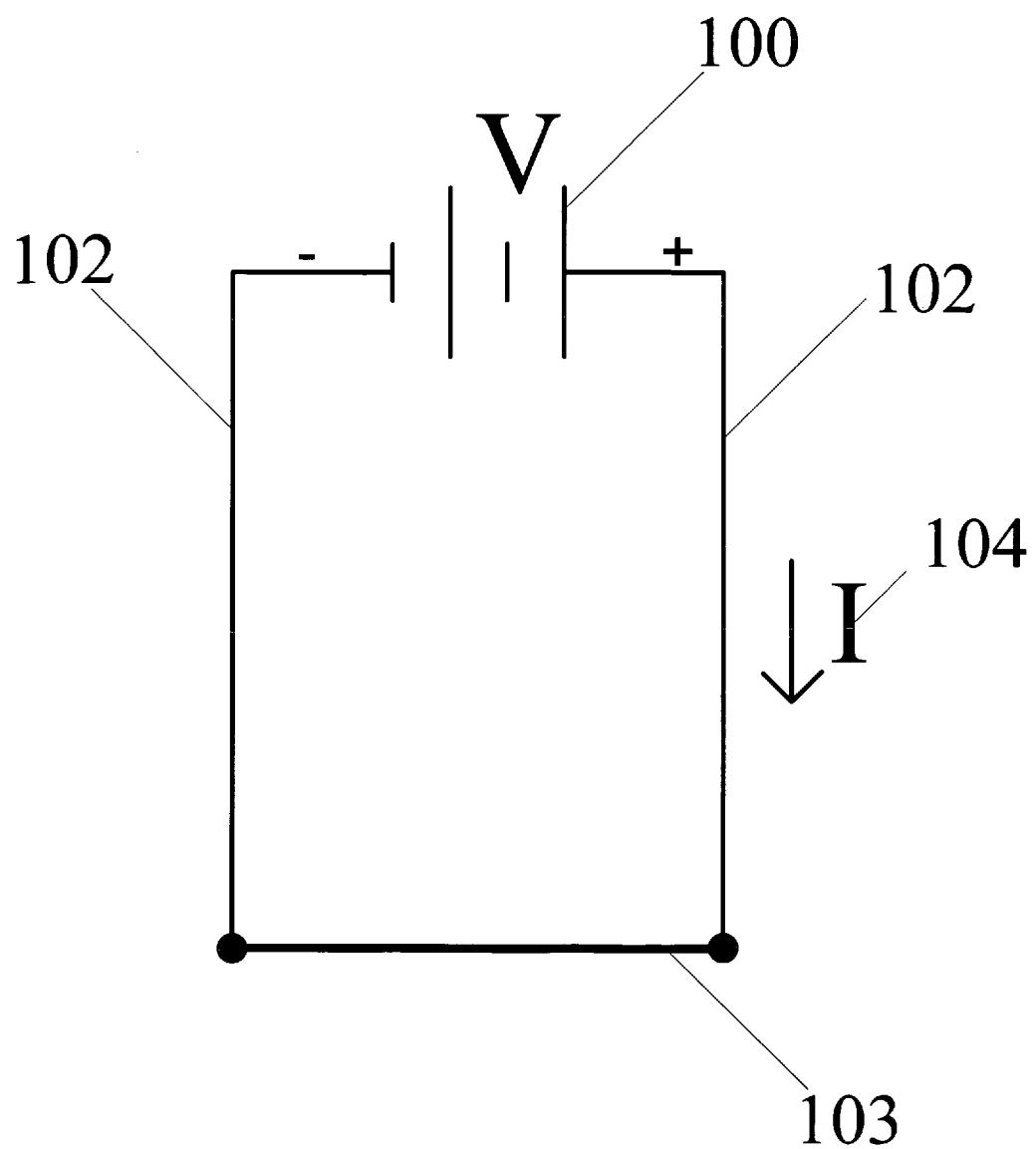
FIG. 1 is a schematic diagram of a thermoelectric circuit that may be used as energy sources in the reactor core.

Traditionally thermoelectric materials are applied to electrical power generators and refrigerative coolers. Both applications require hot and cold junctions with different P-N types of thermoelectric materials. Traditionally based on conversion of thermal (heat) energy to electricity (Seebeck Effect) or of electricity to heat energy (Peltier Effect), for a material to have good thermoelectric properties, it must be a good electrical conductor (i.e., with an electric conductivity greater than 1000 S/cm) and a poor thermal conductor (i.e., with a thermal conductivity less than 2 W/m-K). Because some materials (e.g. carbon such as carbon C60, diamond and graphite; carbon compounds or diamond-like materials such as silicon carbide (SiC) and carbon nitride $C_3N_4$) are good at conducting both electricity and heat, some scientists had ruled them out as a possible good thermoelectric material.

However, we could use special characteristics of such high conductivity material and control the temperature difference between hot and cold sources so that heat would not transfer within the electrode from hot to cold, but only photons would be emitted from an electrode surface to its surrounding medium. Therefore, thermoelectric materials for the instant invention require having not only high electrical conductivity but also high thermal conductivity. An acceptable material are electrical conductor with an electric conductivity greater than 500 S/cm and thermal conductor with a thermal conductivity greater than 1 W/m-K). The higher the electric and thermal conductivity of the electrode material, the more copious the emission of photons. Therefore a material with an electric conductivity greater than 1000 S/cm and a thermal conductivity greater than 500 W/m-K is preferable. The most preferable materials have electric conductivity greater than 1000 S/cm and thermal conductivity greater than 1000 W/m-K.

Light carries extremely high-temperature heat-propagating electromagnetic waves (or thermal radiation) in a temperature range from 2000° K to >30,000° K, from red light to blackbody (dark light) that efficiently transmits thermoelectric energy to a target medium for all chemical compounds, including hydrogenous compounds and water, in an ultra-fast manner. When the thermoelectric materials used to construct both hot and cold junctions are the same, when the current is applied to the electrode between the two junctions with small temperature difference, and when this electrode has extremely high thermal and electrical conductivities, the heat energy carried by the high-speed electrons having no place to go within the electrode would be emitted as photons to dissipate its heat to the surroundings. Note that the speed of light ($3 \times 10^8$ m/s in vacuum) is much higher than the speed of electrons. Quantum theory explains the emission of a photon caused by an electron dropping into a quantum state of lower energy. In our case, the light occurs near a thermoelectric electrode because the electrode resists the flow of electrons. This resistance heats the electrode material to a temperature where the majority of the thermal radiation is generated and falls in the visible light spectrum. Therefore, the energy conversion is extremely rapid and its efficiency is extremely high.

Heat is transferred rapidly and in great quantity by thermal radiation (in absolute temperature to the fourth power, $T^4$) from the electrode to the surrounding medium. By using thermoelectric materials, the light, from red light (2000-3500° K), yellow light (5000-6000° K), yellow white light (6000-7500° K) to white light (7500-11000° K), has been observed in a vessel during the experimental tests that contains liquid target medium materials (see Table 2). The extremely high-temperature light spectra decompose the chemical bonds of the target medium almost instantly. Extensive experimental work has been conducted and demonstrated in the laboratory. During the tests, water, vegetable oils, glycerol, ammonia, human urine, etc. have been used as target medium. A great amount of hydrogen-rich synthetic gas has been produced (see Table 1 for those tests using water, sugar and water, and vegetable oils).

Figure 2:
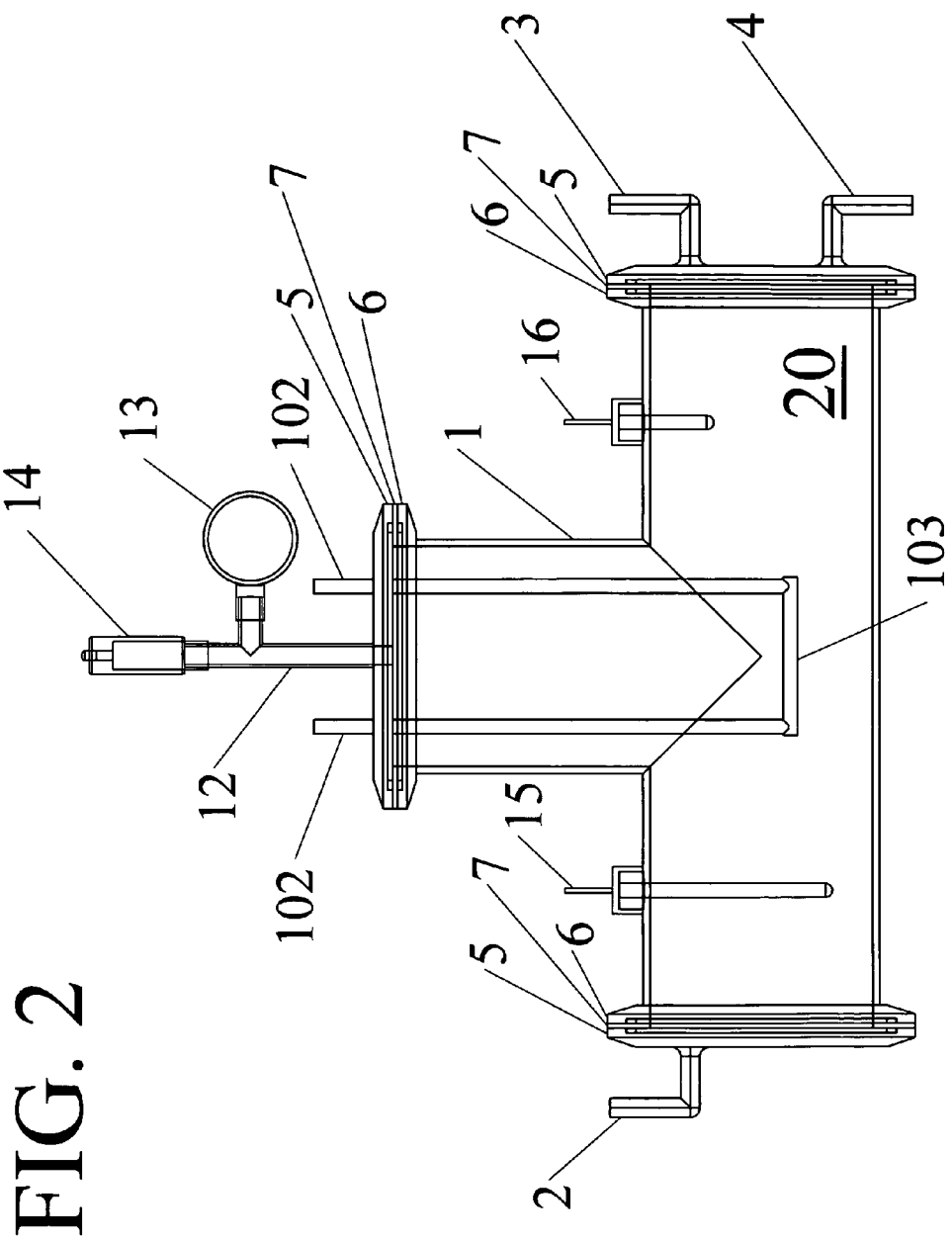
FIG. 2 is a cross sectional view of a thermoelectric reformer.

The preferred embodiment of the thermoelectric reformer is shown in FIG. 2. A thermoelectric reformer core 20 is enclosed within a rigid casing 1 and removable endplates 5 that are preferably stainless steel. The casing may comprise several ceramic, stainless steel or metal alloys that resist to hydrogen embrittlement. Suitable ceramics include $Al_2O_3$, $ZrO_2$ or mixture of both. Liquid or gaseous fuel enters the reformer core through fuel inlet pipe 2 that connects with an end plate. An energy source 100 (shown in FIG. 1 but not FIG. 2) is connected to cables 102 and electrode 103, which is submerged in the reformer core. This thermoelectric circuit liberates photons or light carrying high-temperature energy within reactor core 20. The high temperature energy dissociates the fuel to form synthetic gases such as hydrogen ($H_2$), methane ($CH_4$), ethane ($C_2H_6$) acetylene ($C_2H_4$), ethene ($C_2H_2$), carbon monoxide (CO), and carbon dioxide ($CO_2$) as shown in Table 1.

The reactor core 20 may contain two portions: an upper portion containing light synthetic gases and a lower portion containing the heavier liquid or vaporized fuel. The electrode 103 must be submerged in the liquid or vaporized fuel. The boundary of the upper and lower portion for liquid fuel is easily identified. But it is difficult to identify the boundary between gaseous fuel and dissociated synthetic gas. For gaseous fuels, a virtual boundary is assumed between the heavier fuel at lower portion and the lighter $H_2$-rich syngas at the upper portion. Temperature sensor 15 measures the temperature at the lower portion of the reactor core while sensor 16 measures the temperature at upper portion of the reactor core. The removable endplates 5 are connected to an O-ring cushion or gasket 7 and hollow flange 6. The hollow flange 6 may be welded to casing 1 as part of the thermoelectric reformer. An endplates also connect with a hydrogen-rich synthetic gas outlet pipe 3 and fuel outlet pipe 4. The fuel outlet pipe 4 mainly serves as an exhaust fuel blow-down device for collecting elemental carbon, residue, etc., for performing reactor maintenance, and for recycling unreformed fuel. The reformer core should also be equipped with a pressure tube 12 connected to a pressure gage 13 and pressure relief safety valve 14 as a safety measure.

The drawings show the reactor to have a T-shape, The advantages of using a stainless steel T-shaped tube include (1) worldwide commercial availability and (2) ease in stacking side-by-side (see FIG. 3) with as many Tees as we want if more $H_2$ capacity is needed. However, this invention does not exclude other configurations and other shapes of the reactor core that have the same functions and serve the same purposes. For example, the hydrogen-rich syngas outlet pipe 3 could be located on the top of the Tee, next to the pressure relief safety valve 14. Also the reactor could be just regular cylindrical containers.

The simplest embodiment of the thermoelectric circuit, an energy source 100, electric cables 102, an electrode 103 made of thermoelectric materials is shown in FIG. 1. In the circuit, the electric current 104 flows from the energy source to the electrode. This invention uses thermoelectric materials in the electrode to convert the electric energy into high temperature heat within the electrode. This generates the light in a spectrum with wavelengths from 300 nm to 700 nm. The light dissipates extremely large quantities of heat generated in the electrode into the fuels introduced into the reformer core and breaks down their chemical bonds into synthetic gases quickly and efficiently. Therefore, this type of thermoelectric effect is direct conversion of electricity to photons or light that carries extremely high-temperature heat energy for dissociation of chemical bonds. The energy source 100 could be electricity from: the grid, any type of batteries (such as lead acid battery, or zinc-nickel batteries, etc.), fuel cells, and power genrertors (such as internal combustion engines, gas turbine, wind power, solar power, or ocean thermal energy conversion (OTEC) etc.). The electrode 103 could contain a thermoelectric material, with bimetals such as Bi—Ti, or Sb—Te, or compounds of copper, aluminum, silver, the thermoelectric material having extremely high electric conductivity and thermal conductivity. Since the electrode material emits photons and carries extremely high thermal energy, it must sustain high temperature without deforming. Also, since the electrode material directly contacts the fuels, it must resist the reaction with fuels as well as causing the corrosion by the fuels.

The fuel being dissociated in the reformer core attains extremely high temperature and emits light colors associated with its temperatures. When temperature increases, the colors move from long wavelengths to short wavelengths that is from red, yellow, blue, violet, ultraviolet to black colors. The temperatures associated with the colors are listed in Table 2, below

TABLE 2

Temperature - Color Correlation

| Color | Surface Temperature (° K) | Wavelength (nm) |
|---|---|---|
| Blue or blue white | >30,000 | 380-440 |
| Blue white or green white | 11,000-30,000 | 440-485 |
| White | 7,500-11,000 | 485-500 |
| Yellow white | 6,000-7,500 | 500-565 |
| Yellow | 5,000-6000 | 565-590 |
| Orange | 3,500-5,000 | 590-625 |
| Red | 2,000-3,500 | 625-740 |

Because the thermoelectric electrodes are in contact with the material being reformed, or with reformate products, as they flow pass in the reactor, the thermoelectric electrodes should be made of materials that are corrosion-resistant, as well as capable of withstanding high temperatures, because the stream passing through the reactor may contain corrosive materials, such as methanol and hydrogen sulfide. Several semiconductor materials, combinations of semiconductor and metal material or thermoelectric materials that can withstand high temperature environments and corrosive feed streams may be used for the electrodes. Appropriate ceramic (semiconductor) materials include zirconium oxide, molybdenum disillicide, silicon carbide, cerium dioxide, lanthanum chromite, silicon oxide silicon, boron carbide ($B_4C$). Appropriate metal and metal compounds include of ruthenium oxide, titanium oxide, silver, gold, copper, aluminum, tungsten, iridium, ruthenium, molybdenum, zinc, cobalt, cadmium, chromium, nickel, bismuth, osmium and inconel. Also, the electrodes may be made of two or three thermoelectric metals, such as Fe—Si, Si—Ge, Ge—Pb—Te, Pb—Te, Pb—Se, Pb—Se—Te, $Bi_2Te_3$, and $Sb_2Te_3$.

This physical contact between the heating means and the feed stream has the advantage of allowing the formation and enhancement of a plasma near the electrode surfaces because of the high temperature of the heating surfaces, above 2000° K Most areas next to the thermoelectric electrode exhibit white light and yellow light that has temperatures at 3000-11,000° K according to the light spectrum shown in Table 2. Such plasma enhances the speed with which chemical bonds of the feed streams are reformed and also enhances dissociation of the process products. This plasma enhancement also promotes gas-phase electrolysis that produces free hydrogen from water. Light in the liquid phase as well as in the gas phase above the liquid surface has been observed during the experiments whose results are summarized in Table 1. Different color lights were observed. A white light was observed surrounding thermoelectric electrode 103, and then followed by the yellow white and yellow colors, and lastly by a red color light were observed as one moved further from the electrode. This means that the temperature next to electrode is the highest (~7500-11,000° K for white light) while the temperature furthest away from the electrode is the lowest (~2000-3500° K for the red light) as shown in Table 2.

The present invention includes generation of electromagnetic waves as thermal radiation, photons or light that promote dissociation, ionization for plasma formation, or both. Dissociation gases (bubbles being carried away rapidly from the reaction site) lead to non-equilibrium conditions and drive the equilibrium-limited reactions to very high conversion rates. Therefore, the efficiency with which chemical compounds are reformed and dissociated is enhanced by these electromagnetic radiation (light wave) and hydrodynamic flow (bubble rising upward).

Figure 3:
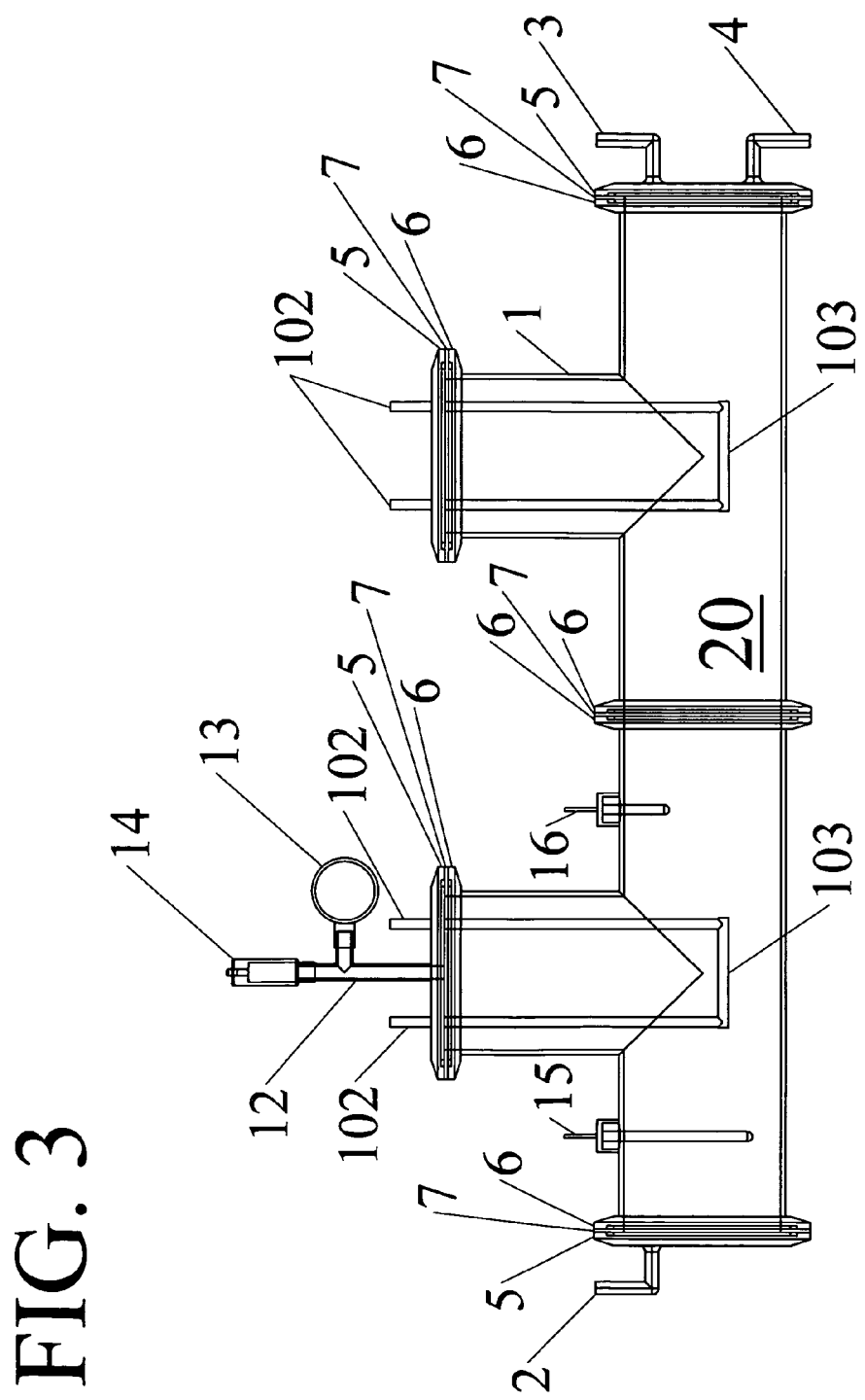
FIG. 3 is a cross-sectional view of a reformer core with two sets of thermoelectric circuits.

A preferred embodiment of the thermoelectric reformer is shown in FIG. 3, with two sets of thermoelectric circuits in a unitary thermoelectric reformer. Each energy source (not shown in FIG. 3) is connected by cables 102 to electrodes 103 that liberate photons or light carrying high-temperature energy within the reformer core 20. These two sets of energy sources can be connected in series or in parallel. Electric current 104 flows from the power source 100 (see FIG. 1) through two sets of cables 102, heating electrode 103, and back to the power source 100. In this figure, the thermoelectric reformer shares a common fuel inlet pipe 2, a reactor core 20, two temperature sensors 15 and 16, a pressure tube 12, a pressure gage 13, a pressure relief safety valve 14, a hydrogen-rich synthetic gas outlet pipe 3 and a fuel outlet pipe 4. Note that the casing is in two parts that are simply connected by two hollow flanges 6 and an O-ring cushion or gasket 7 to form a single casing 1. There is no limit on the number of energy sources (or energy sets) that can be used. Multiple energy sets are appropriate if a large volume of hydrogen production is required.

Figure 4:
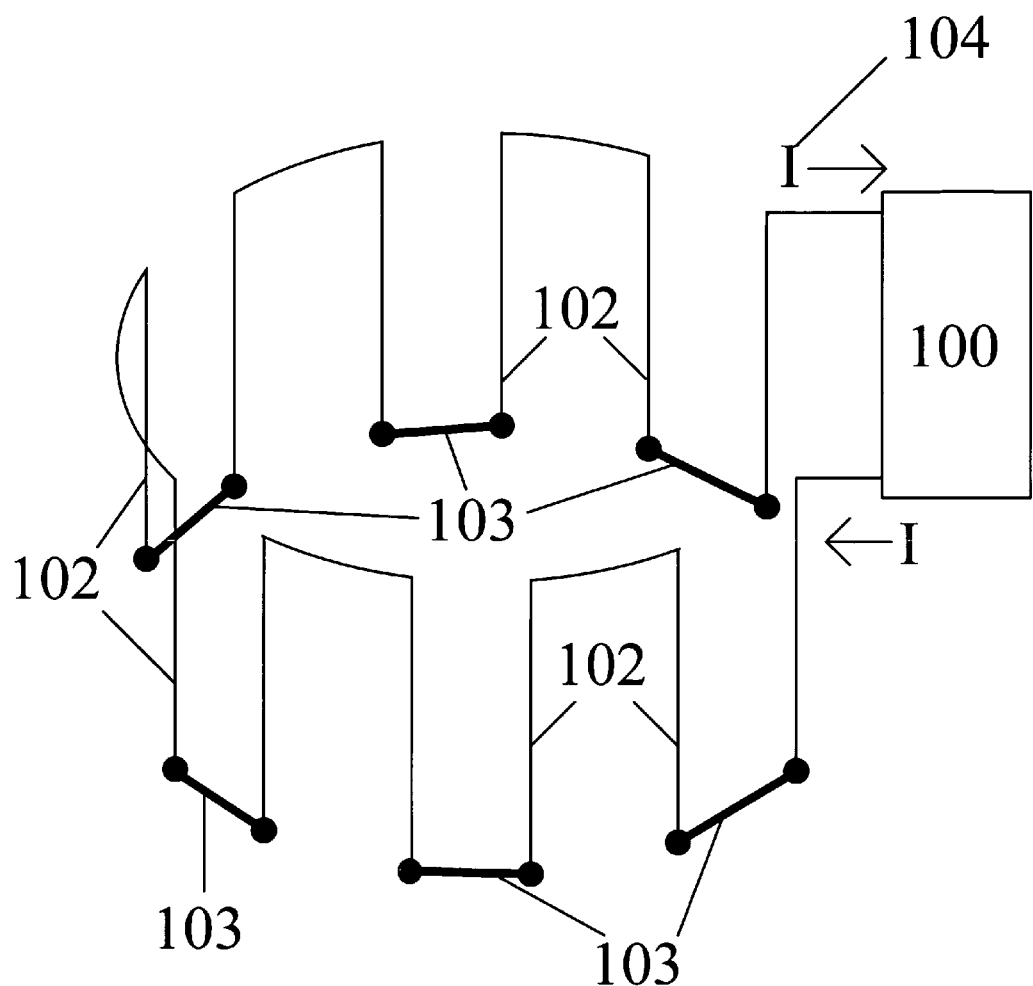
FIG. 4 is a schematic diagram of the thermoelectric circuit in series.

FIG. 4 illustrates a schematic diagram of an thermoelectric circuit in series. Current I 104 is generated from an energy source 100 passing through six electrodes 103 in a reactor core 20 (see FIG. 2 or FIG. 3) and flows back to the energy source 100. Each set of electrodes 103 has two cable legs 102 that connect with the cables legs of adjacent to the electrodes in series. A cable leg of an electrode adjacent to the energy source connects to the energy source. Electric current I 104 flows from the power source 100 through the array of cables 102 and electrodes 103, and back to the power source 100. There is no limit on how many electrodes 103 may be in series. The six sets of electrodes shown in this figure are just an example. Each set of electrode and cable legs has the same current I 104 from an energy source 100, but may or may not have the same voltage. The casing of the reformer can be unitary (as shown in FIGS. 2-3) or the casing can consist of multiple cylinders, each hosting thermoelectric circuits.

Figure 5:
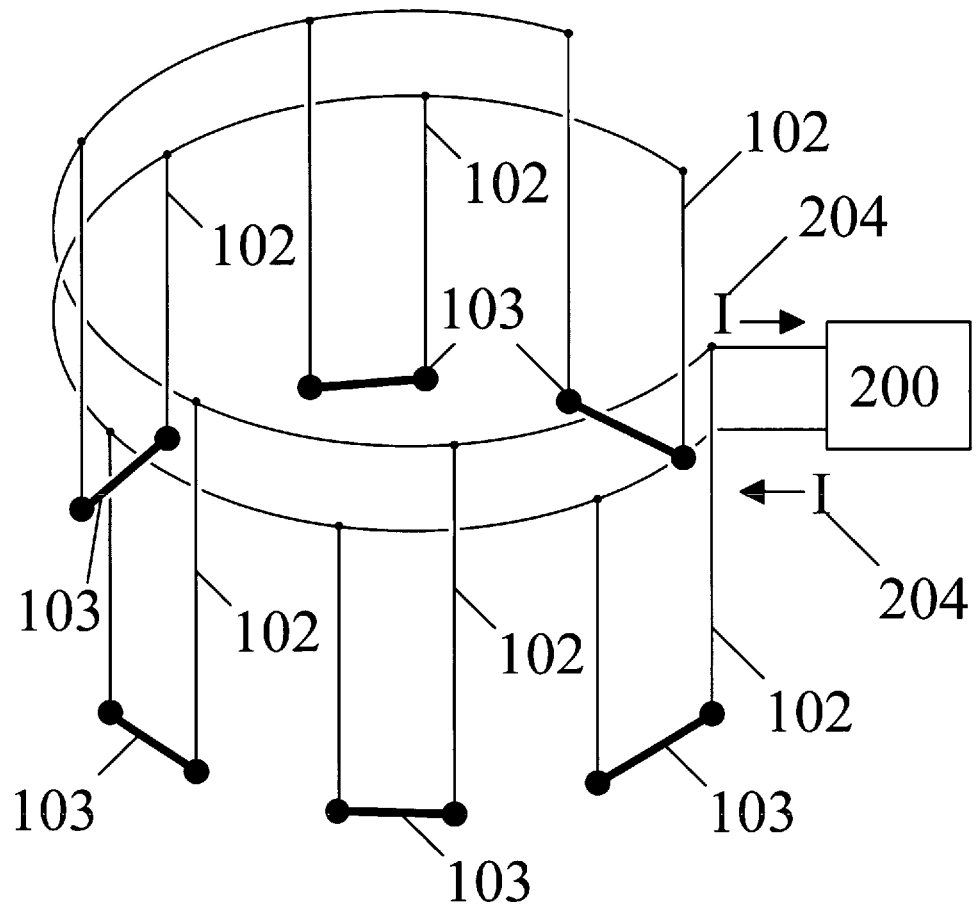
FIG. 5 is a schematic diagram of the thermoelectric circuit in parallel.

FIG. 5 illustrates a thermoelectric circuit with six electrodes in parallel. Current I 204 is generated from an energy source 200 passing through each of the six electrodes 103 in a reactor core 20 (not shown) and flowing back to the energy source 200. Each electrode 103 has two cable legs 102 that connect with another set of an electrode 103 and cable legs 102 in parallel. Electric current 204 flows from the power source 200 through the array of cables 102 and electrodes 103, and then back to the power source 200. As with electrodes in series, there is no limit on how many sets of electrodes and cables can be used. Each set has the same voltage from an energy source 200, but may or may not has the same current. The casing 1 (not shown in FIG. 5) can be the same as FIGS. 2-3 or as with electrodes in series, the casing can consist of multiple cylinders, each hosting thermoelectric circuits.

The reformer produces a hydrogen-rich synthetic gas stream containing product gases such as those shown in Table 1. This synthetic gas stream can be used directly in certain types of fuel cells (such as solid oxide fuel cells), or can be fed into internal combustion engines (such as gasoline engines, diesel engines, gas turbines), or other energy conversion equipment (such as a Fisher-Tropsch reactor or integrated gas combined cycle (IGCC)), without purification or with only limited levels of purification. However, for use as energy input for some types of fuel cells such as the Proton Exchange Membrane (PEM) fuel cell and alkaline fuel cells, this synthetic gas stream must be purified to a high level of hydrogen purity.

Figure 6:
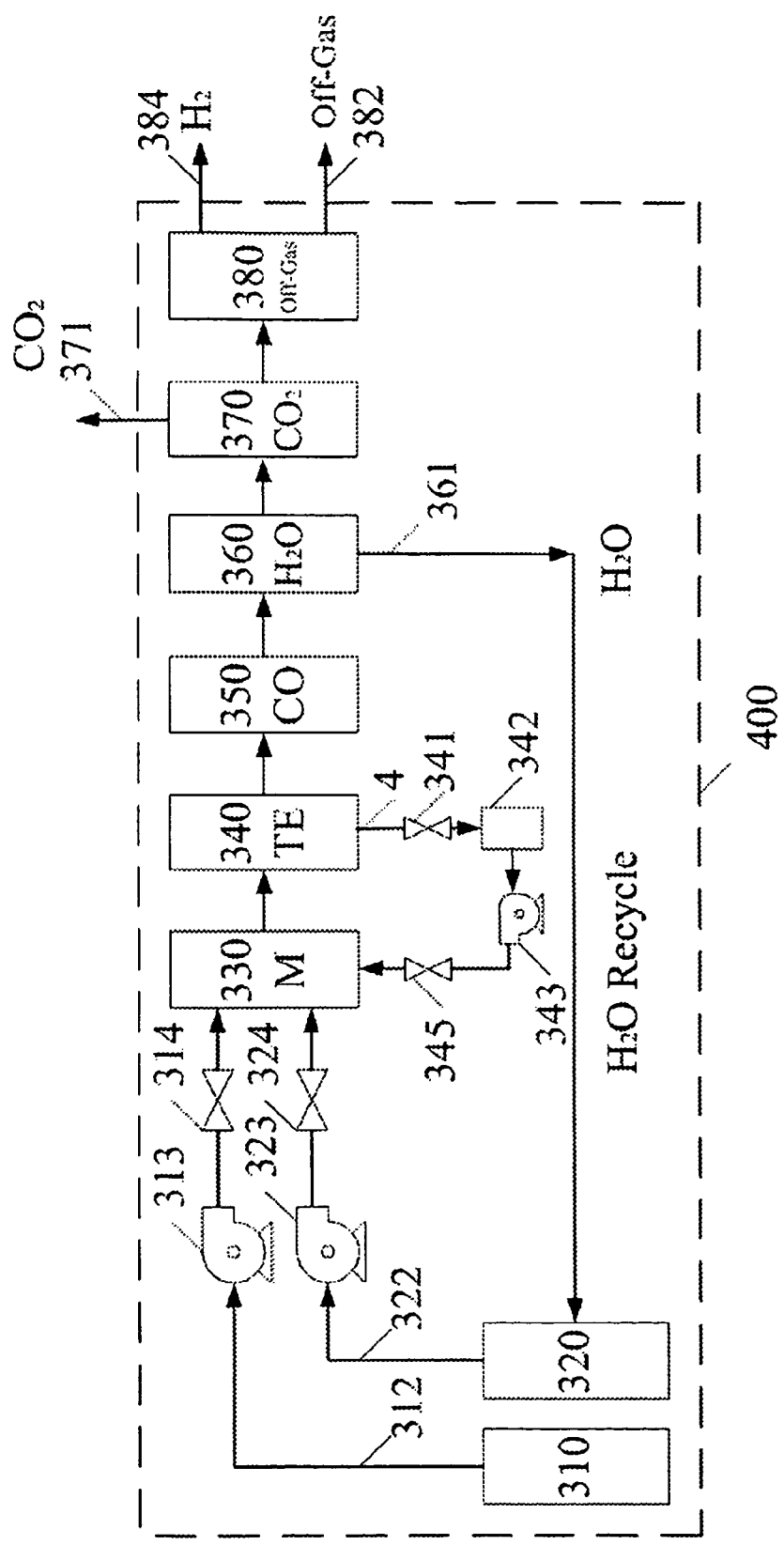
FIG. 6 is a flow diagram of the thermoelectric reformer together with ancillary components that generates pure hydrogen.

FIG. 6 is a flow diagram of the thermoelectric reformer together with ancillary components that together comprise a thermoelectric reformer unit that generates pure hydrogen (>99% $H_2$). The thermoelectric reformer unit is enclosed within metal casing 400, that is preferably stainless steel. Liquid or gaseous fuel 310 entering the unit through fuel inlet pipe 312 and enters mixer (M) 330 through fuel pump 313 and control valve 314. Liquid or gaseous $H_2O$ 320 entering the processor through water inlet pipe 322 and enters the mixer 330 through water pump 323 and control valve 324. The fuel and water are mixed in the mixer to form a uniform mixture that is directed to the thermoelectric reformer (TE) 340 where dissociation occurs. Leaving the thermoelectric reformer is a synthetic gas stream that contains $H_2$, CO, $CO_2$, and hydrocarbons. The unreformed fuel and reaction residue also leave through the fuel outlet pipe 4 and enter into the breakdown tank 342 through a valve 341. The unreformed fuel is pumped back to the mixer 330 through a pump 343 and a valve 345. The breakdown tank 342 collects the residue, element carbon, etc. from the fuel reaction occurred in the thermoelectric reformer 340, and the unreformed fuel. For maintenance purposes, the breakdown tank 342 can be isolated by closing both valves 341 and 345 without interrupting the system operation. In normal operation, the unreformed fuel is filtered before recycling back to the mixer 330.

This synthetic gas could be processed through the following components to separate out high-purity hydrogen. The synthetic gas stream then enters a CO-converter (CO) 350 where carbon monoxide is converted to carbon dioxide and $H_2$. The CO-converter could use water shift technology to accomplish this conversion. Then an $H_2O$ removal component ($H_2O$) 360 uses drying or condensing technology to remove moisture or steam from the synthetic gas stream and recycle it through pipe 361 to augment the $H_2O$ 320 entering the unit. Next a $CO_2$ Separator ($CO_2$) 370 produces separate $CO_2$ 371 and $H_2$-rich streams. The $CO_2$ Separator could use pressure swing adsorption (PSA) or other chemical means (such as NaOH and $NaHCO_3$) technology. The $H_2$-rich gas stream which includes hydrogen and trace hydrocarbons, is finally directed into the Off-Gas Separator 380 to obtain very high purity (e.g. >99.99% by volume) hydrogen that leaves the unit through hydrogen pipe 384. This hydrogen can be input directly into a fuel cell requiring very high purity hydrogen as fuel, such as those using PEM technology, The trace hydrocarbons then can be separated out as off-gas that leaves the unit through off-gas pipe 382. The Off-Gas Separator can use the commercially available technologies like PSA or a palladium (Pd) membrane.

I claim:

1. A thermoelectric reformer unit for hydrogen production from liquid or gaseous hydrogenous compounds comprising:
   a rigid reformer casing with a fuel entry side and a synthetic gas exit side, the reformer casing having at least one section;
   an inlet pipe for liquid or gaseous hydrogenous fuel that penetrates the rigid reformer casing through its entry side;
   a reformer core penetrated by the inlet pipe and containing a single electrode made of thermoelectric material in a circuit with an energy source, the electrode emitting high energy photons in visible light to ultraviolet or black light spectra and being submerged in the hydrogenous fuel, and wherein the thermoelectric material has an electrical conductivity greater than 500 S/cm and a thermal conductivity greater than 1 W/m-° K;
   an outlet pipe for hydrogen-rich synthetic gas formed by the dissociation of hydrogenous fuel that penetrates the exit side of the rigid reformer casing; and
   an unreformed fuel outlet pipe that penetrates the exit side of the reformer casing; and means for relieving pressure in the reformer core caused by synthetic gas formation.

2. A thermoelectric reformer unit as set forth in claim 1 further comprising a mixer where fuel, both input to the thermoelectric reformer unit and unreformed fuel recycled from the thermoelectric reformer, and $H_2O$, both input to the thermoelectric reformer unit and recycled from a $H_2O$ removal module are mixed prior to entering the thermoelectric reformer, a carbon monoxide converter that converts carbon monoxide in the synthetic gas stream leaving the thermoelectric reformer unit to carbon dioxide, the $H_2O$ removal module that removes $H_2O$ from the synthetic gas stream that leaves the carbon monoxide converter for recycle to the mixer, a carbon dioxide separator that separates out carbon dioxide in the synthetic gas stream leaving the carbon dioxide converter and an off-gas separator module that separates the synthetic gas stream leaving the carbon dioxide separator into a pure hydrogen stream and an off-gas stream.

3. A thermoelectric reformer unit for hydrogen production from liquid or gaseous hydrogenous compounds comprising:
   a rigid reformer casing with a fuel entry side and a synthetic gas exit side, the reformer casing having at least one section;
   an inlet pipe for liquid or gaseous hydrogenous fuel that penetrates the rigid reformer casing through its entry side, the entry side of the reformer casing having cushioning means and being able to be connected to other sections of the reactor casing with flanges;
   a reformer core penetrated by the inlet pipe and containing electrode means made of thermoelectric material in a circuit with an energy source, the electrode emitting high energy photons in visible light to ultraviolet or black light spectra and being submerged in the hydrogenous fuel, wherein the thermoelectric material has an electrical conductivity greater than 500 S/cm and a thermal conductivity greater than 1 W/m-° K, and further wherein the reformer core contains internal partitions with penetration means to form compartments, each compartment containing an electric circuit with thermoelectric electrodes, with synthetic gas flowing from one compartment to another,
   an outlet pipe for hydrogen-rich synthetic gas formed by the dissociation of hydrogenous fuel that penetrates the exit side of the rigid reformer casing, the entry side of the reformer casing having cushioning means and being able to be connected to other sections of the reactor casing with flanges; and
   an unreformed fuel outlet pipe that penetrates the exit side of the reformer casing wherein the entry side and the exit side of the reactor casing are removable plates that have cushioning means and can be connected to other sections of the reformer casing with flanges and means for relieving pressure in the reformer core caused by synthetic gas formation.

4. A thermoelectric reformer unit as set forth in claim 3 wherein each electric circuit contains one thermoelectric electrode.

5. A thermoelectric reformer unit as set forth in claim 3 wherein each electric circuit contains plural thermoelectric electrodes.

6. A thermoelectric reformer unit as set forth in claim 4 further comprising a mixer where fuel, both input to the thermoelectric reformer unit and unreformed fuel recycled from the thermoelectric reformer, and $H_2O$, both input to the thermoelectric reformer unit and recycled from a $H_2O$ removal module are mixed prior to entering the thermoelectric reformer, a carbon monoxide converter that converts carbon monoxide in the synthetic gas stream leaving the thermoelectric reformer unit to carbon dioxide, the $H_2O$ removal module that removes $H_2O$ from the synthetic gas stream that leaves the carbon monoxide converter for recycle to the mixer, a carbon dioxide separator that separates out carbon dioxide in the synthetic gas stream leaving the carbon dioxide converter and an off-gas separator module that separates the synthetic gas stream leaving the carbon dioxide separator into a pure hydrogen stream and an off-gas stream.

7. A thermoelectric reformer unit as set forth in claim 5 further comprising a mixer where fuel, both input to the thermoelectric reformer unit and unreformed fuel recycled from the thermoelectric reformer, and $H_2O$, both input to the thermoelectric reformer unit and recycled from a $H_2O$ removal module are mixed prior to entering the thermoelectric reformer, a carbon monoxide converter that converts carbon monoxide in the synthetic gas stream leaving the thermoelectric reformer unit to carbon dioxide, the $H_2O$ removal module that removes $H_2O$ from the synthetic gas stream that leaves the carbon monoxide converter for recycle to the mixer, a carbon dioxide separator that separates out carbon dioxide in the synthetic gas stream leaving the carbon dioxide converter and an off-gas separator module that separates the synthetic gas stream leaving the carbon dioxide separator into a pure hydrogen stream and an off-gas stream.

8. A thermoelectric reformer unit for hydrogen production from liquid or gaseous hydrogenous compounds comprising:
   a rigid reformer casing with a fuel entry side and a synthetic gas exit side the reformer casing having at least one section;
   an inlet pipe for liquid or gaseous hydrogenous fuel that penetrates the rigid reformer casing through its entry side;
   a reformer core penetrated by the inlet pipe and containing electrode means made of a bimetal or triple-metal material selected from the group consisting of Fe—Si, Si—Ge, Sb—Te, Ge—Pb—Te, Pb—Te, Pb—Se, Pb—Se—Te, $Bi_2Te_3$, and $Sb_2Te_3$. in a circuit with an energy source, the electrode means emitting high energy photons in visible light to ultraviolet or black light spectra and being submerged in the hydrogenous fuel;
   an outlet pipe for hydrogen-rich synthetic gas formed by the dissociation of hydrogenous fuel that penetrates the exit side of the rigid reformer casing; and
   an unreformed fuel outlet pipe that penetrates the exit side of the reformer casing; and means for relieving pressure in the reformer core caused by synthetic gas formation.

9. A thermoelectric reformer unit as set forth in claim 8 further comprising a mixer where fuel, both input to the thermoelectric reformer unit and unreformed fuel recycled from the thermoelectric reformer, and $H_2O$, both input to the thermoelectric reformer unit and recycled from a $H_2O$ removal module are mixed prior to entering the thermoelectric reformer, a carbon monoxide converter that converts carbon monoxide in the synthetic gas stream leaving the thermoelectric reformer unit to carbon dioxide, the $H_2O$ removal module that removes $H_2O$ from the synthetic gas stream that leaves the carbon monoxide converter for recycle to the mixer, a carbon dioxide separator that separates out carbon dioxide in the synthetic gas stream leaving the carbon dioxide converter and an off-gas separator module that separates the synthetic gas stream leaving the carbon dioxide separator into a pure hydrogen stream and an off-gas stream.

\* \* \* \* \*